(12) United States Patent
Phillips et al.

(10) Patent No.: US 9,785,943 B2
(45) Date of Patent: Oct. 10, 2017

(54) METHODS FOR RISK MANAGEMENT IN PAYMENT DEVICE SYSTEM

(75) Inventors: Simon Phillips, York (GB); Ronald D. Carter, Barrington (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 1764 days.

(21) Appl. No.: 12/731,521

(22) Filed: Mar. 25, 2010

(65) Prior Publication Data

US 2011/0238539 A1    Sep. 29, 2011

(51) Int. Cl.
*G06Q 40/00* (2012.01)
*G06Q 20/40* (2012.01)

(52) U.S. Cl.
CPC ......... *G06Q 20/4016* (2013.01); *G06Q 20/40* (2013.01); *G06Q 40/00* (2013.01); *G06Q 40/12* (2013.12)

(58) Field of Classification Search
CPC ...... G06Q 40/00; G06Q 40/025; G06Q 20/10; G06Q 20/102

USPC .............................................. 705/35, 38, 39
See application file for complete search history.

(56) References Cited

U.S. PATENT DOCUMENTS

| | | | |
|---|---|---|---|
| 7,319,986 B2 | 1/2008 | Praisner et al. | |
| 7,606,760 B2 | 10/2009 | Hutchison et al. | |
| 2006/0047593 A1* | 3/2006 | Naratil et al. | 705/35 |
| 2008/0126145 A1* | 5/2008 | Rackley, III et al. | 705/7 |
| 2010/0268615 A1* | 10/2010 | Rosenberger | 705/17 |
| 2012/0143722 A1* | 6/2012 | John | 705/26.41 |

* cited by examiner

*Primary Examiner* — Lalita M Hamilton
(74) *Attorney, Agent, or Firm* — Buckley, Maschoff & Talwalkar LLC

(57) ABSTRACT

A method includes setting a risk management limit to be applied to authorized purchase transactions for a payment card account. The method further includes detecting that purchase transactions for the payment card account have approached the risk management limit and sending a message to the account holder to notify the account holder that the risk management limit is imminent. In addition, the method includes detecting that the account holder has requested re-setting of the risk management limit and then re-setting the risk management limit.

17 Claims, 9 Drawing Sheets

METHODS FOR RISK MANAGEMENT IN PAYMENT DEVICE SYSTEM

BACKGROUND

Payment cards such as credit or debit cards are ubiquitous. For decades, such cards have included a magnetic stripe on which the relevant account number is stored. To consummate a purchase transaction with such a card, the card is swiped through a magnetic stripe reader that is part of a point of sale (POS) terminal. The reader reads the account number from the magnetic stripe. The account number is then used to route a transaction authorization request that is initiated by the POS terminal. The authorization request is routed from the merchant's acquiring financial institution ("acquirer") to a server computer operated by or on behalf of the issuer of the payment account. The issuer's server computer provides a response to the authorization request. If the response indicates that the issuer has authorized the transaction, the transaction is consummated at the point of sale. Later the transaction is cleared for settlement via the acquirer and the issuer.

More recently, cards that incorporate an integrated circuit (IC) have been utilized as payment cards. In various embodiments, IC payment cards may be interfaced to a POS terminal via contacts on the card. During a purchase transaction, the payment card account number and other information may be uploaded from the IC payment card to the POS terminal via the IC card contacts and a contact card reader that is included in the POS terminal. Authorization and clearing may then proceed in substantially the same manner as for a transaction initiated with a mag stripe payment card (putting aside additional security measures that may be implemented by using the processing capabilities of the IC payment card).

In other IC payment card systems, the exchange of information between the card and the POS terminal proceeds via wireless RF (radio frequency) communications. These wireless communication payment cards are sometimes referred to as "contactless" payment cards. One example of a contactless payment card standard is referred to in the United States by the brand name "PayPass" and was established by MasterCard International Incorporated, the assignee hereof. It has also been proposed to use wireless exchanges of information via NFC (Near Field Communication) for payment applications.

Conventional payment system purchase transactions that require real-time on-line communication with the account issuer—for the purpose of authorization or (in a "one message" system) for immediate charge against the customer's account—are sometimes referred to as "on-line" transactions.

It has been proposed that the capabilities of a contactless payment card be incorporated into a mobile telephone, thereby turning the mobile telephone into a contactless payment device. Typically a mobile telephone/contactless payment device includes integrated circuitry with the same functionality as the RFID (radio frequency identification) IC of a contactless payment card. In addition, the mobile telephone/contactless payment device includes a loop antenna that is coupled to the payment-related IC for use in sending and/or receiving messages in connection with a transaction that involves contactless payment.

Contactless payment devices in other form factors, such as key fobs, wristwatches, wristbands and stickers, have also been proposed.

It is typically the case that a credit card account carries a credit limit, which is the maximum total amount of credit that the issuer of the account is willing to extend at any one time on the account. For debit card accounts, the amount of funds on deposit in the account at any given time may function as a limit on spending in the account. Further, it has been proposed to apply other, and usually much lower, spending limits on debit and/or credit card accounts for the purpose of limiting potential losses from stolen or misused payment devices. These lower spending limits may serve to manage risk of losses due to fraud, etc., and may for example be in the range of a few hundred dollars. The present inventors now propose certain techniques to aid payment device users in managing spending limits set for risk management purposes.

BRIEF DESCRIPTION OF THE DRAWINGS

Features and advantages of some embodiments of the present invention, and the manner in which the same are accomplished, will become more readily apparent upon consideration of the following detailed description of the invention taken in conjunction with the accompanying drawings, which illustrate preferred and exemplary embodiments and which are not necessarily drawn to scale, wherein.

DETAILED DESCRIPTION

In general, and for the purpose of introducing concepts of embodiments of the present invention, a payment device issuer's computer may track a risk management spending limit and send a warning notice to the device user's mobile telephone when the user is close to reaching the spending limit. The notice may prompt the user to access his/her online banking or mobile banking user account to cause the limit to be re-set, so that spending on the account will continue to be permitted. This may provide a convenient mechanism for allowing the user to manage the spending limit, while providing reasonable protection against unauthorized re-setting of the spending limit.

Figure 1:
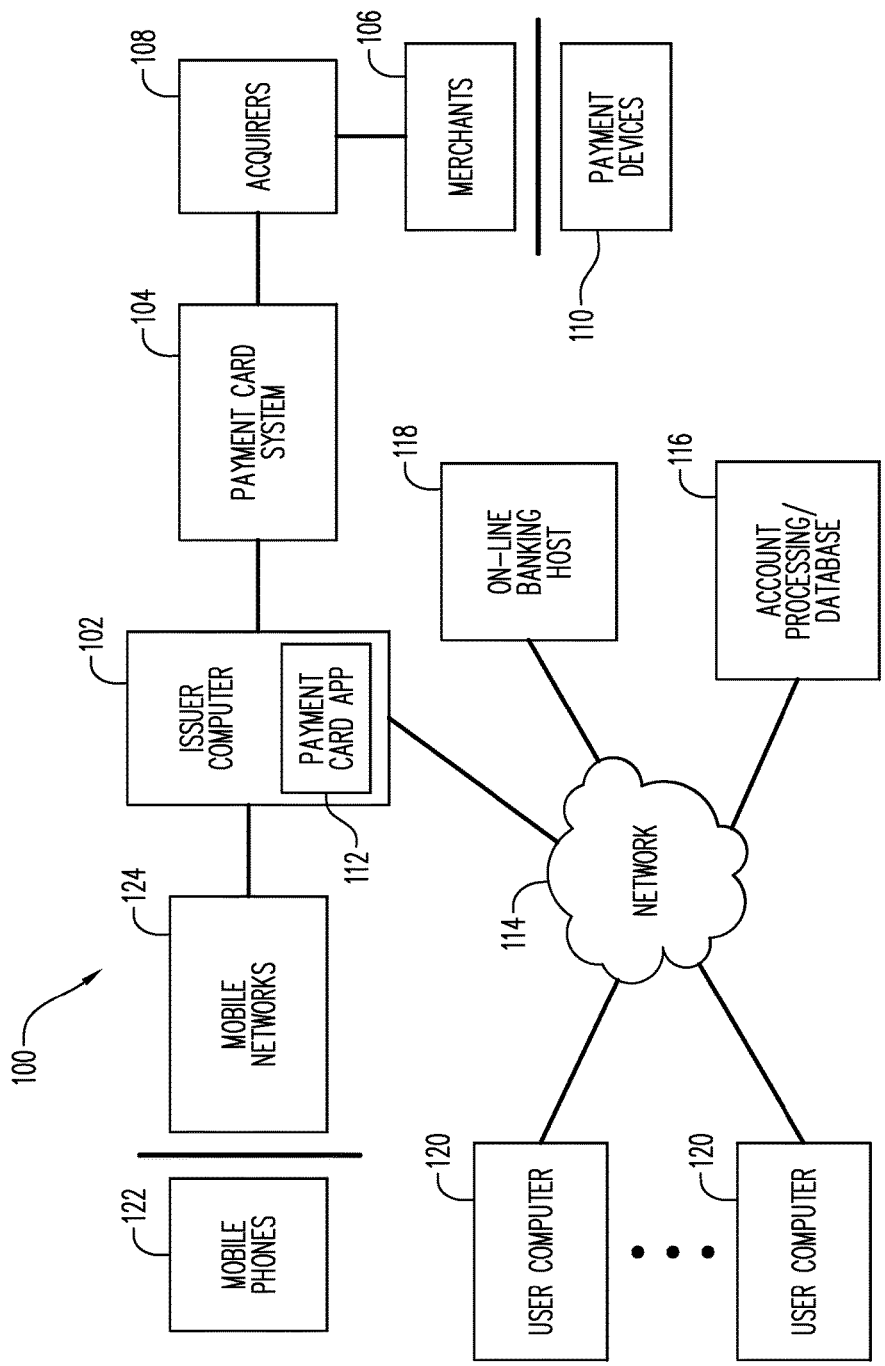
FIG. 1 is a block diagram that illustrates a system provided in accordance with aspects of the present invention.

FIG. 1 is a block diagram that illustrates a system 100 provided in accordance with aspects of the present invention.

The system 100 includes a payment card issuer server computer 102. Details of the payment card issuer server computer 102 are provided below in conjunction with FIG. 2. However, to briefly anticipate later discussion, the payment card issuer server computer 102 may be operated by or on behalf of a financial institution ("FI"; not separately shown) that issues payment card accounts to individual users. In many respects, the payment card issuer server computer 102 may perform conventional functions, such as (a) receiving and responding to requests for authorization of payment card account transactions to be charged to payment card accounts issued by the FI; and (b) tracking and storing transactions and maintaining account records. In addition, as described in detail below, the payment card issuer server computer 102 may function in accordance with aspects of the present invention to apply, and support management of, risk management spending limits (hereinafter also referred to as "risk management limits").

Block 104 in FIG. 1 represents a conventional payment card system, such as the "Banknet" system operated by MasterCard International, Inc., the assignee hereof. Payment card system 104, among other functions, routes transaction authorization requests to the payment card issuer server computer 102. As is customary, these requests originate from merchants (block 106) and are introduced into the system 104 by acquiring FIs (block 108) that have relationships with the merchants 106. The requests occur in response to users (not shown) who present payment devices (block 110) issued by the issuer FI in connection with purchase transactions at the merchants 106. The payment devices 110 may, for example, include one or more of: conventional magnetic stripe cards, contactless payment cards, contactless-payment-enabled mobile telephones, contactless payment fobs or wristbands. In some embodiments, the payment devices may include mobile telephones that have a small contactless payment card or contactless payment sticker adhered thereto. With this type of payment device, the user may make purchases by tapping his/her mobile telephone on the proximity reader components (not separately shown) of POS terminals (not separately shown). This type of payment device associates payment capabilities with a mobile telephone, but without requiring any physical modification or programming of the telephone itself.

Referring again to the payment card issuer server computer 102, block 112 represents a payment card issuer application program that runs on the payment card issuer server computer 102. The payment card issuer application program may control the payment card issuer server computer 102 to perform functions such as handling and responding to transaction authorization requests, maintaining payment card accounts, and administering and managing risk management limits, as described herein.

The payment card issuer server computer 102 is connected to a data network 114. The data network 114 may be composed of one or more private data networks and/or one or more public data networks such as the Internet.

Block 116 in FIG. 1 represents one or more data processing resources that are operated by the same FI that operates the payment card issuer server computer 102. The data processing resources 116 may function in a conventional manner to maintain and update record keeping in connection with deposit accounts issued by the FI. These data processing resources may be referred to as account processing and database computers, and may also be connected to the data network 114.

Block 118 in FIG. 1 represents a web-hosting computer operated by or on behalf of the FI for the purpose of providing on-line banking services to the FI's customers. These on-line banking services allow customers to set up on-line user accounts that may be accessed via the customers' personal computers (blocks 120) and/or mobile telephones. With the latter capabilities, the on-line banking services encompass a mobile banking system. The on-line banking host computer 118 may be connected to the data network 114, and may operate primarily in accordance with conventional practices, but may also interact with the payment card issuer server computer 102 in accordance with aspects of the present invention as described below. The user computers 120 may also be connected to the data network 114.

As will be seen, in connection with managing risk management limits, the payment card issuer server computer 102 may send warning notices to users' mobile telephones 122 via one or more of the well-established mobile telephone service networks 124. From previous discussion, it will be appreciated that at least some of the mobile telephones 122 may also function as payment devices 110.

Figure 2:
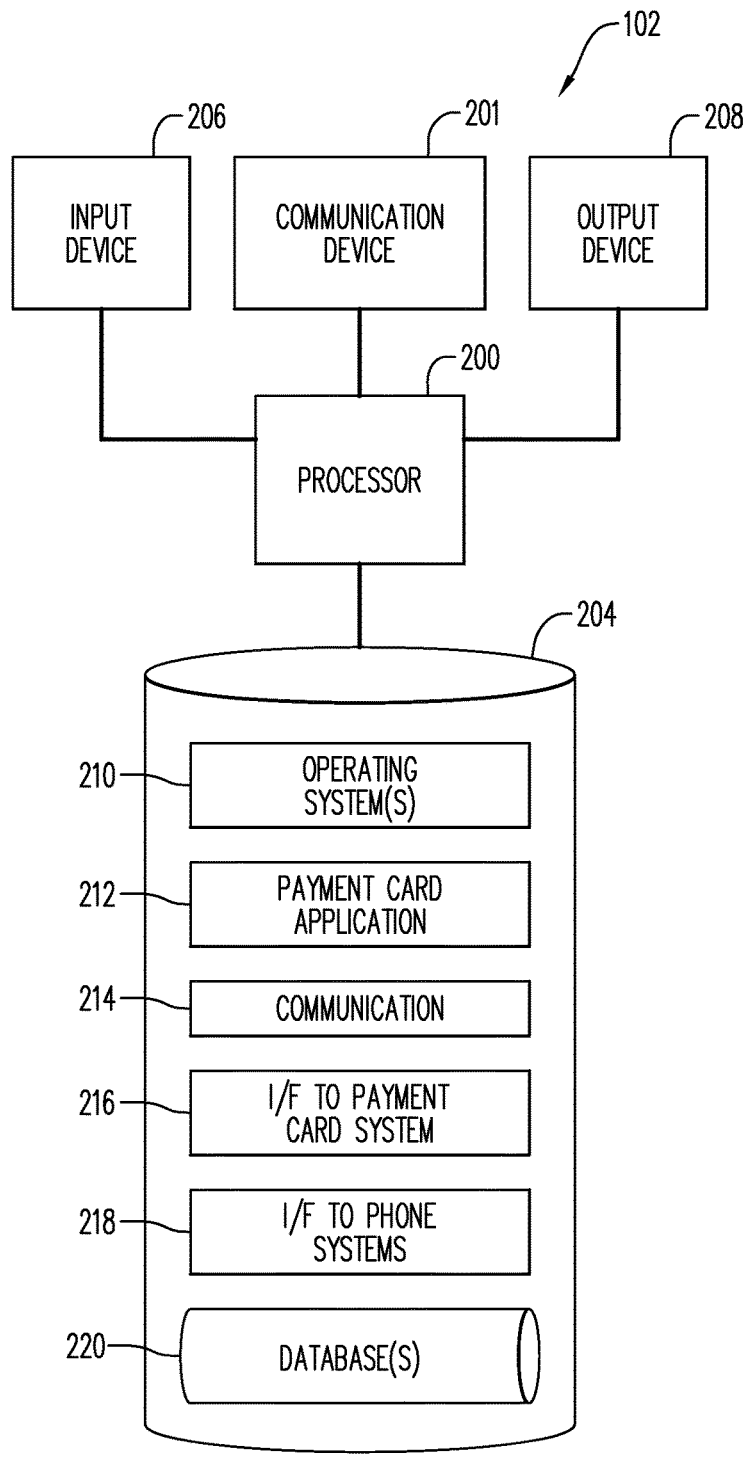
FIG. 2 is a block diagram that illustrates an embodiment of a server computer that is part of the system of FIG. 1, and that operates in accordance with aspects of the present invention.

FIG. 2 is a block diagram that illustrates an embodiment of the payment card issuer server computer 102.

The payment card issuer server computer 102 may be conventional in its hardware aspects but may be controlled by software to cause it to function as described herein. For example, the payment card issuer server computer 102 may be constituted by conventional server computer hardware.

The payment card issuer server computer 102 may include a computer processor 200 operatively coupled to a communication device 201, a storage device 204, an input device 206 and an output device 208.

The computer processor 200 may be constituted by one or more conventional processors. Processor 200 operates to execute processor-executable steps, contained in program instructions described below, so as to control the payment card issuer server computer 102 to provide desired functionality.

Communication device 201 may be used to facilitate communication with, for example, other devices (such as the payment card system 104, the account processing and database computers 116, the on-line banking host computer 118, and the mobile telephones 122/mobile telephone service networks 124). For example, communication device 201 may comprise numerous communication ports (not separately shown), to allow the payment card issuer server computer 102 to communicate simultaneously with a number of other computers and other devices, including communications as required to simultaneously handle numerous transaction authorization requests from the payment card system 104.

Input device 206 may comprise one or more of any type of peripheral device typically used to input data into a computer. For example, the input device 206 may include a keyboard and a mouse. Output device 208 may comprise, for example, a display and/or a printer.

Storage device 204 may comprise any appropriate information storage device, including combinations of magnetic storage devices (e.g., magnetic tape and hard disk drives), optical storage devices such as CDs and/or DVDs, and/or semiconductor memory devices such as Random Access Memory (RAM) devices and Read Only Memory (ROM) devices, as well as so-called flash memory. Any one or more of such information storage devices may be considered to be a computer-readable storage medium or a computer usable medium or a memory.

Storage device 204 stores one or more programs for controlling processor 200. The programs comprise program instructions (which may be referred to as computer readable program code means) that contain processor-executable process steps of the payment card issuer server computer 102, executed by the processor 200 to cause the payment card issuer server computer 102 to function as described herein.

The programs may include one or more conventional operating systems 210 that control the processor 200 so as to manage and coordinate activities and sharing of resources in the payment card issuer server computer 102, and to serve as a host for application programs (described below) that run on the payment card issuer server computer 102.

The programs stored in the storage device 204 may also include a payment card issuer application program 212 (also indicated by block 112 in FIG. 1) that controls the processor 200 to enable the payment card issuer server computer 102 to handle various transactions, including authorization requests for payment card system purchase transactions. Other functionality provided by the payment card issuer application program 212 may include administering and maintaining the payment card accounts issued by the FI. Still further, the payment card issuer application program 212 may operate in a manner described below in connection with FIGS. 4, 5 and/or 7 (and in accordance with aspects of the present invention) to manage risk management spending limits.

Another program that may be stored on the storage device 204 is a communication application 214. The communication application 214 may enable the payment card issuer server computer 102 to engage in data communication with other computers in a conventional manner.

The programs stored on the storage device 204 may further include a conventional software interface 216 to the payment card system 104 and a conventional software interface 218 by which the payment card issuer server computer 102 may send messages to (and possibly also receive messages from) the mobile telephones 122 (via the mobile telephone service networks 124).

The storage device 204 may also store, and the payment card issuer server computer 102 may also execute, other programs, which are not shown. For example, such programs may include a billing application, which handles generation of bills to users and which tracks whether payments are received as required. The other programs may also include, e.g., device drivers, etc.

The storage device 204 may also store one or more databases 220 required for operation of the server computer 106, including data regarding users' payment card account balances and transactions and risk management limits.

Figure 3:
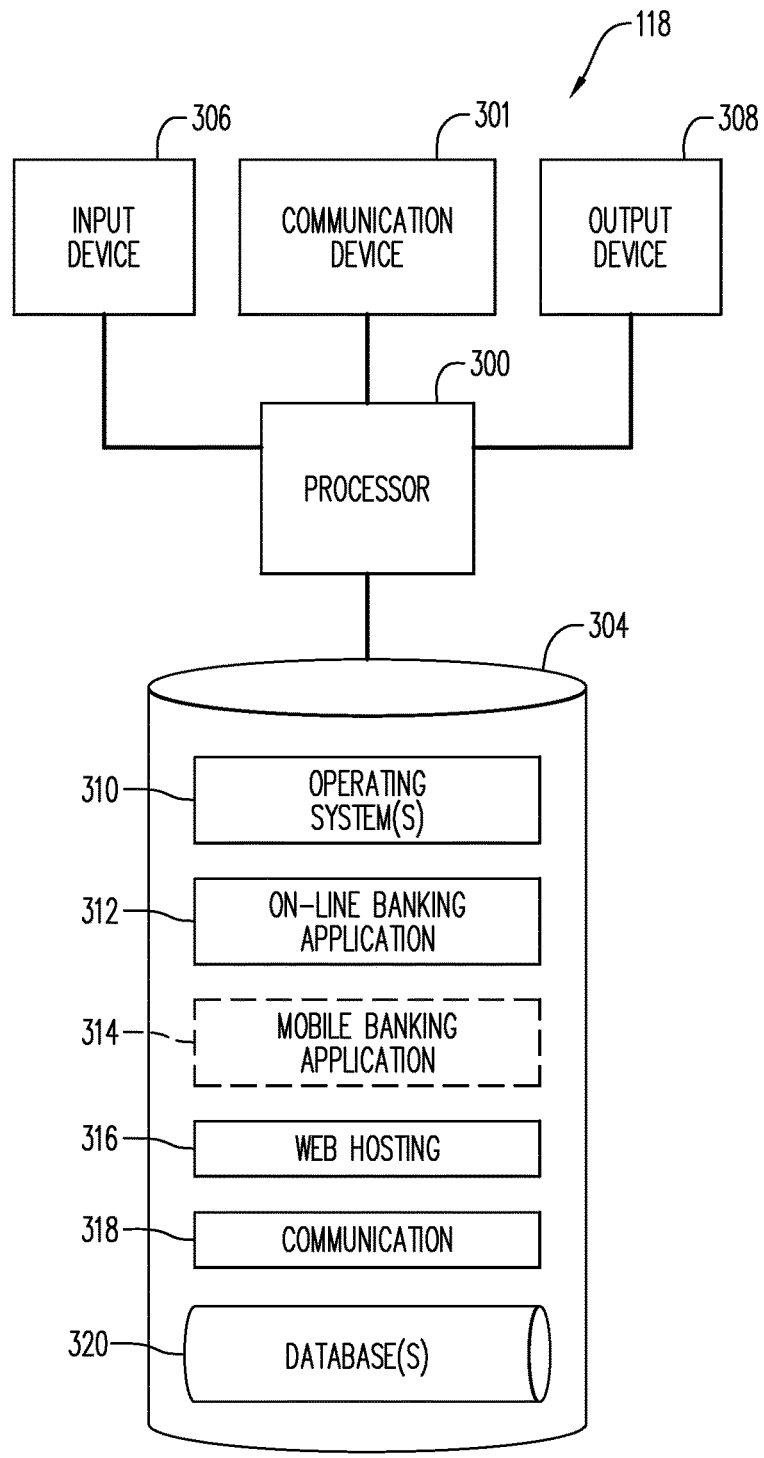
FIG. 3 is a block diagram that illustrates an embodiment of another server computer that is part of the system of FIG. 1, and that operates in accordance with aspects of the present invention.

FIG. 3 is a block diagram that illustrates an embodiment of the on-line banking host computer 118.

The hardware architecture of the on-line banking host computer 118 may be conventional and may be the same as that of the payment card issuer server computer 102. Thus, the above description of the hardware aspects of the payment card issuer server computer 102 is equally applicable to the hardware aspects of the on-line banking host computer 118. Nevertheless, the following description is provided to summarize the hardware components of the on-line banking host computer 118.

The on-line banking host computer 118 may include a processor 300 that is in communication with a communication device 301, a storage device 304, an input device 306 and an output device 308. The storage device 304 may store one or more conventional operating systems 310 as well as an on-line banking application program 312. In many respects the on-line banking application program 312 may be conventional, and may control the on-line banking host computer 118 to support functions such as users' balance inquiries, transfers between accounts, bill payment, etc. In addition, the on-line banking application program 312 may interact, as described below, with the payment card issuer application program of the payment card issuer server computer 102 to provide functionality in accordance with aspects of the present invention. Details of this functionality will be described below.

In addition to or instead of the on-line banking application program 312, the storage device 304 may also store a mobile banking application program 314. The mobile banking application program 314 may control the on-line banking host computer 118 to support conventional mobile banking functions and possibly also to interact with the payment card issuer application program of the payment card issuer server computer 102. In some embodiments, the programs 312 and 314 may be combined or may be one and the same.

In some embodiments, the on-line banking functionality provided by programs 312 and 314 may be divided between two separate servers, of which one supports a PC-based on-line banking system, and the other supports mobile banking.

Further, the storage device 304 may store a conventional web hosting application program 316 and conventional communication software 318. In addition, the storage device 304 may store one or more databases 320 used in connection with operations of the on-line banking host computer 118.

Moreover, the storage device 304 may store other programs, such as device drivers, etc.

Figure 4:
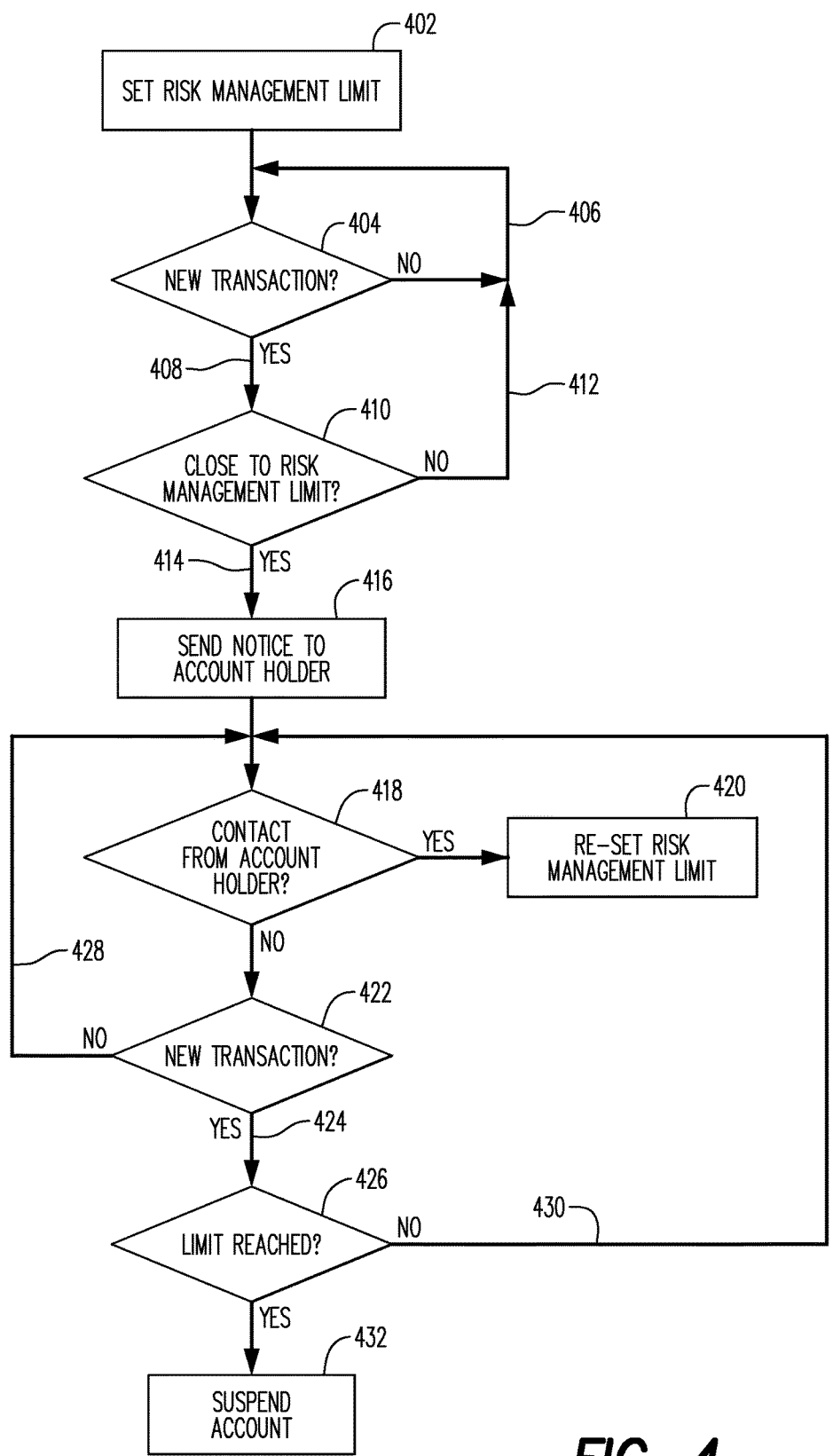
FIG. 4 is a flow chart that illustrates a process that may be performed by the server computer of FIG. 2 in accordance with aspects of the present invention.

FIG. 4 is a flow chart that illustrates a process that may be performed in the payment card issuer server computer 102 in accordance with aspects of the present invention. In particular, FIG. 4 illustrates a process that may be applied separately to each payment card account maintained in the payment card issuer server computer 102, or at least for each payment card account subject to a risk management limit.

At 402 in FIG. 4, the payment card issuer server computer 102 sets a risk management limit for a particular payment card account. For example, the risk management limit may restrict the monetary amount that may be spent in the account during a predetermined period of time, such as each day or each week. The risk management limit may be enforced by the payment card issuer server computer 102 in its handling of authorization requests relating to transactions to be charged to the account in question. In some embodiments, the risk management limit may be automatically re-set at regular intervals, such as at the beginning of each calendar week. In some embodiments, the limit itself (say $300) never changes, but is in effect re-set by setting to zero a cumulative dollar total of authorized transactions that is compared to the limit. As will also be seen, the risk management limit may also be re-set (i.e., the cumulative total for comparison purposes is set to zero) in response to actions taken by the holder of the account. In addition to the limit itself, there may also be a threshold amount that prompts the payment card issuer server computer 102 to send a notice to the account holder when the difference between the limit and the cumulative total of transactions is less than (or equal to) the threshold amount. For example, where the limit is $300, the threshold amount may be $50, such that a notice to the account holder is triggered if the cumulative total equals or exceeds $250.

In some embodiments, instead of denominating the risk management limit as a monetary amount, the payment card issuer server computer 102 may set a number of transactions as the risk management limit.

After the risk management limit has been set for one of the payment card accounts, the payment card issuer server computer 102 tracks transaction authorization requests for that account in order to enforce the risk management limit. For example, as indicated by decision block 404, the payment card issuer server computer 102 determines whether it has received an authorization request for the account in question. If not, then the process idles, as indicated by branch 406 from decision block 404.

However, if the payment card issuer server computer 102 determines that an authorization request for a transaction for the account has been received, then the process of FIG. 4 advances from decision block 404 (via branch 408) to decision block 410. As will be appreciated by those who are skilled in the art, the authorization request includes the monetary amount of the transaction for which authorization is requested. At decision block 410, the payment card issuer server computer 102 uses the transaction amount for the current transaction to determine whether the account is now within the threshold amount of the risk management limit. For example, the payment card issuer server computer 102 may add the transaction amount for the current transaction to a running cumulative total of transaction amounts that the payment card issuer server computer 102 has been keeping for purposes of comparison with the risk management limit. The payment card issuer server computer 102 may then compare the updated cumulative total with the risk management limit to determine whether the difference between the updated cumulative total and the risk management limit is less than or equal to the threshold amount. If not, then the process of FIG. 4 loops back to decision block 404 via branch 412 from decision block 410.

However, if the payment card issuer server computer 102 makes a positive determination at decision block 410 (i.e., if the payment card issuer server computer 102 determines that the updated cumulative total of transaction amounts is within the threshold amount relative to the risk management limit), then the process of FIG. 4 advances from decision block 410 via branch 414 to block 416.

At block 416, the payment card issuer server computer 102 sends a message (i.e., a warning notice) to the holder of the account to notify the account holder that his/her usage of the account is close to the risk management limit. For example, the payment card issuer server computer 102 may send the message as a text message to the account holder's mobile telephone 122 (FIG. 1). In addition or alternatively, the payment card issuer server computer 102 may send the message as an electronic mail message to the account holder's electronic mail account address (e.g., "gmail", "aol", "yahoo", etc.).

Figure 6A:
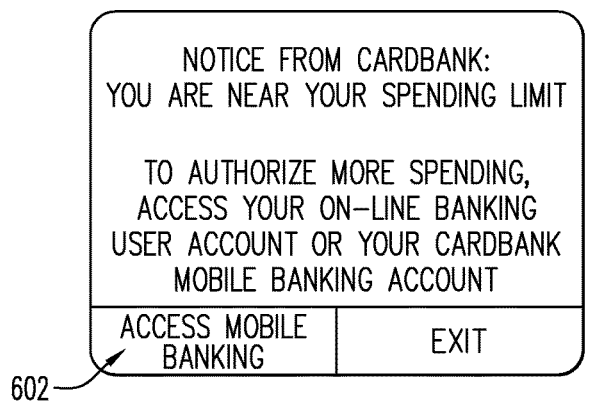
FIGS. 6A-6E are screen displays that may be presented on the display component of a user's mobile telephone in accordance with aspects of the present invention.

FIG. 6A shows an example screen display that may be presented to the account holder via his/her mobile telephone to convey a text message version of the warning message from the payment card issuer server computer 102. As seen from FIG. 6A, the warning message instructs the account holder to access his/her on-line banking website user account or his/her mobile banking account to authorize a re-set of the risk management limit (also referred to as a "spending limit"). It will be appreciated that if the account holder does not have a mobile banking account or does not have an on-line banking website user account, then the warning message would not instruct the account holder to access such account.

In addition or alternatively, the payment card issuer server computer 102 may send the message (block 416) in one or more other modes, such as in the form of an audio message to the account holder's mobile telephone.

Following block 416, the process of FIG. 4 advances to decision block 418. At decision block 418, the payment card issuer server computer 102 determines whether the account holder has made contact with the system in a manner required to trigger re-setting of the risk management limit. For example, the account holder may have logged on to his/her user account for an on-line banking website offered by the issuer FI. Typically, this would require the account holder to enter his/her user PIN (personal identification number) for his/her user account, so that there is a degree of security (i.e., one-factor security) in effect for this type of contact. Examples will be given below concerning types of interaction that may occur between the payment card issuer application program 212 of the payment card issuer server computer 102 and the on-line banking application program 312 of the on-line banking host computer 118, such that the payment card issuer server computer 102 is notified that the account holder has accessed his/her user account for the on-line banking website.

Alternatively, in order to authorize re-setting of the risk management limit, the account holder may access his/her mobile banking account. An example of how this may take place is illustrated with reference to FIGS. 6A-6C. Referring initially to FIG. 6A, reference numeral 602 indicates a soft key label included in a screen display presented to the account holder by his/her mobile telephone in response to the warning message sent to the account holder's mobile telephone by the payment card issuer server computer 102 at 416 in FIG. 4.

As illustrated in FIG. 6A, the soft key label 602 represents an "access mobile banking" option. The account holder may actuate a left-hand soft key (not shown) on the mobile telephone to select the "access mobile banking" option. Upon the account holder doing so, the mobile telephone may respond by launching a mobile banking application and displaying the screen display shown in FIG. 6B. In particular, the screen display prompts the account holder to enter his/her mobile banking PIN in field 604 and to select an "enter" option 606 with the left-hand soft key. Assuming that the account holder has entered the mobile banking PIN correctly, as verified by the mobile banking application in the mobile telephone or by the on-line banking application program 312 in the on-line banking host computer 118, the mobile banking application in the mobile phone is permitted by the on-line banking application program 312 in the on-line banking host computer 118 to access the account holder's mobile banking account. Under these circumstances, this granting of access to the account holder's mobile banking account may result in the mobile telephone providing a screen display as illustrated in FIG. 6C. Referring to FIG. 6C, the screen display depicted therein may serve to indicate to the account holder that the risk management limit has been re-set. This notification may reflect behind-the scenes interaction between the mobile banking application program 314 in the on-line banking host computer 118 and the payment card issuer application program 212 in the payment card issuer server computer 102.

Figure 6B:
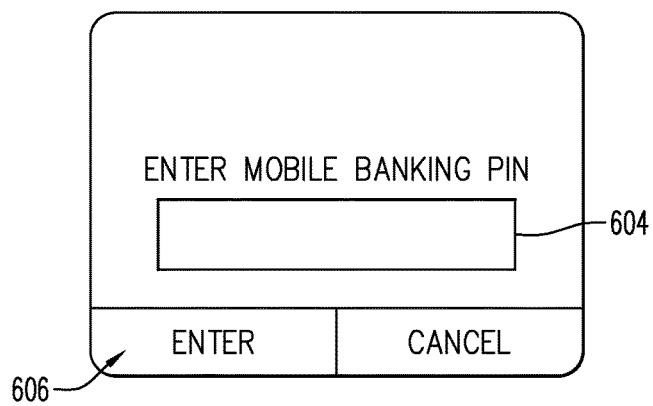
Figure 6C:
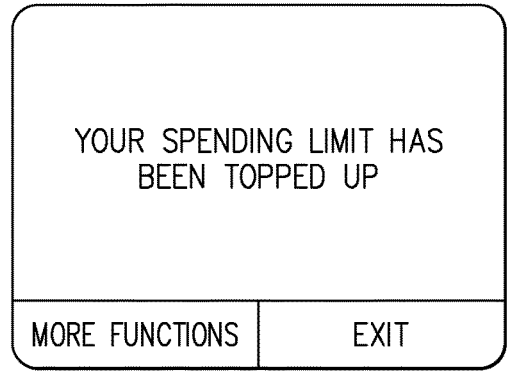

In the example illustrated with FIGS. 6A-6C, the mere act of accessing the mobile banking account in response to the warning message of FIG. 6A results in re-setting of the risk management limit in the account holder's payment card account. However, in alternative embodiments, the account holder may be required to affirmatively select an option/function such as "top up MasterCard account spending limit" (not shown in the drawings), after accessing the mobile banking account, in order to authorize a re-set of the risk management limit.

In other situations, the account holder may respond to the warning message by operating his/her personal computer 120 (FIG. 1)—or another web-enabled device—so as to access his/her on-line banking website user account. As in the case of the mobile banking account example given above in connection with FIGS. 6A-6C, the mere fact that the account holder has accessed his/her on-line banking website user account may cause the risk management limit to be re-set for his/her payment card account. This again may result from behind-the-scenes interaction between the on-line banking application program 312 in the on-line banking host computer 118 and the payment card issuer application program 212 in the payment card issuer server computer 102. As before, in some embodiments, the account holder may be required to expressly select a re-set authorization option via the on-line banking website in order to authorize re-setting of the risk management limit.

If the account holder lacks both an on-line banking website user account and a mobile banking account, or under other circumstances or in other embodiments, another procedure may be employed to permit the account holder to authorize re-setting of the risk management limit. An example of such an alternative procedure is illustrated with reference to FIGS. 6D-6E.

Figure 6D:
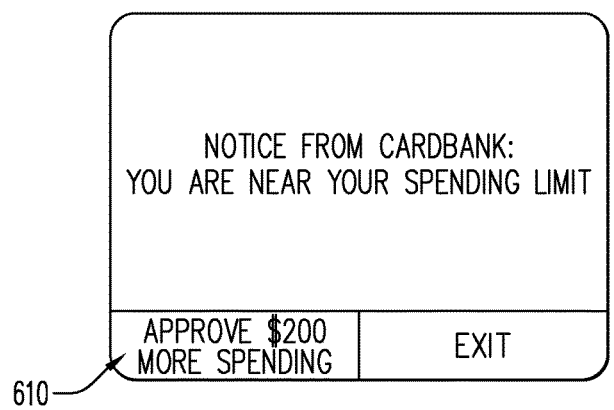
Figure 6E:
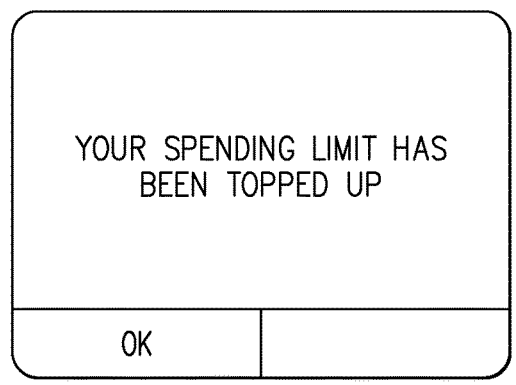

FIG. 6D shows a screen display presented to the account holder by his/her mobile telephone in response to an alternative version of the warning message sent to the account holder's mobile telephone by the payment card issuer server computer 102 at 416 in FIG. 4. As illustrated in FIG. 6D, the warning message screen display includes a soft key label 610 that represents an "approve more spending" option. The account holder may actuate the left-hand soft key (not shown) on the mobile telephone to select this option. Assuming that the account holder does so, then the mobile telephone transmits a response message (e.g., a text message) to the payment card issuer server computer 102 it indicate that the account holder is authorizing a re-set of the spending limit. The payment card issuer server computer 102 may then do so, and may transmit another text message to the mobile telephone, resulting in a screen display like that shown in FIG. 6E, thereby confirming to the account holder that the risk management limit has been re-set.

In this example re-set authorization procedure, the account holder is not required to enter a PIN. However, in other embodiments, the procedure may be modified to require entry of a PIN by the account holder.

Referring again to FIG. 4, block 420 represents the payment card issuer server computer 102 re-setting the risk management limit on the account holder's payment card account in response to a contact from the account holder, as described in the above examples. To summarize, the contact may consist, for example, of the account holder accessing his/her mobile banking account or on-line banking website user account, or by the account holder sending a message from his/her mobile telephone to the payment card issuer server computer 102. In some embodiments, the payment card issuer server computer 102 accomplishes the re-setting of the risk management limit by setting to zero a cumulative total of transaction dollar amounts that the payment card issuer server computer 102 compares with the risk management limit.

If the payment card issuer server computer 102 does not receive, or receive notification of, a contact from the account holder for the purpose or with the effect of authorizing re-setting of the risk management limit, then decision block 422 follows decision block 418. Decision block 422 is similar to decision block 404 (discussed above) in terms of its function within the process of FIG. 4. That is, in executing decision block 422, the payment card issuer server computer 102 continues to track transaction authorization requests for the payment card account in question. If the payment card issuer server computer 102 receives a new authorization request, then the process of FIG. 4 advances from decision block 422 via branch 424 to decision block 426. If not, the process of FIG. 4 loops back from decision block 422 to decision block 418 via branch 428 from decision block 422. That is, after the payment card issuer server computer 102 sends the warning message to the account holder at block 416, the process of FIG. 4 may loop through decision blocks 418 and 422 until the payment card issuer server computer 102 either receives (or receives notice of) contact from the account holder to re-set the risk management limit, or the payment card issuer server computer 102 receives a new authorization request for the account.

At decision block 426 (reached in the event of a new authorization request), the payment card issuer server computer 102 uses the transaction amount for the current transaction to determine whether the current transaction would breach the risk management limit. For example, the payment card issuer server computer 102 may add the transaction amount for the current transaction to the running cumulative total of transactions used for comparison to the risk management limit. The payment card issuer server computer 102 may then compare the updated cumulative total with the risk management limit to determine whether the updated cumulative total exceeds the risk management limit. If not, then the process of FIG. 4 loops back to decision block 418 via branch 430 from decision block 426.

However, if the payment card issuer server computer 102 makes a positive determination at decision block 426 (i.e., if the payment card issuer server computer 102 determines that the updated cumulative total of transaction amounts exceeds the risk management limit), then the payment card issuer server computer 102 may decline the authorization request, thereby effectively suspending the payment card account in question as indicated by block 432 in FIG. 4. (In effect, the payment card account may not be completely suspended, in the sense that, in some embodiments, the payment card issuer server computer 102 may again update the cumulative total of transaction amounts to remove the declined transaction, and then, in response to another authorization request for a smaller amount, may approve the transaction if it would not push the cumulative amount over the risk management limit.)

Figure 5:
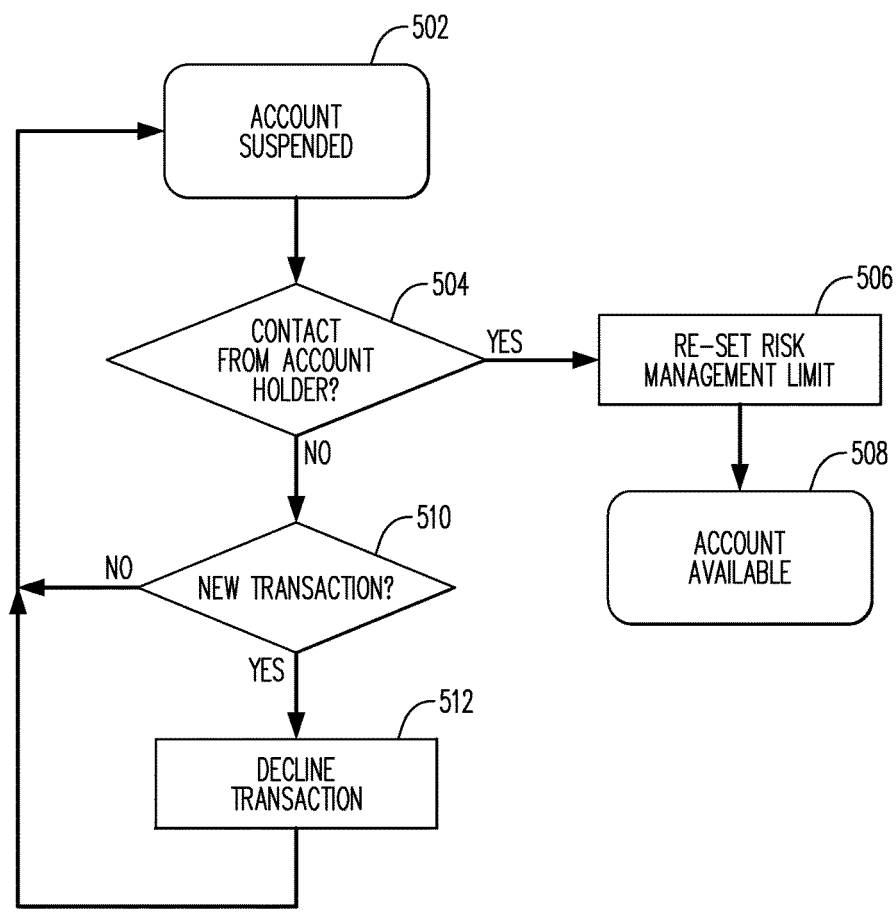
FIG. 5 is a flow chart that illustrates some details of the process that is illustrated in FIG. 4.

FIG. 5 provides some details of the suspended account condition indicated by block 432 in FIG. 4. Referring to FIG. 5, block 502 indicates that the payment card account in question is in the suspended condition. Decision block 504 and block 506—similar to blocks 418 and 420 in FIG. 4—indicate that if a suitable contact is made by the account holder to authorize re-setting of the risk management limit, then the risk management limit is re-set, and the account may again be available (block 508) for further transactions.

In the absence of such contact from the account holder, then decision block 510 and block 512 indicate that the payment card issuer server computer 102 will decline new transaction authorization requests and the account will remain in the suspended condition (block 502). (In some embodiments, as noted above, the payment card issuer server computer 102 may automatically re-set the risk management limit after a pre-determined lapse of time, even if the account holder does not make a contact to authorize re-setting the risk management limit.)

Figure 7:
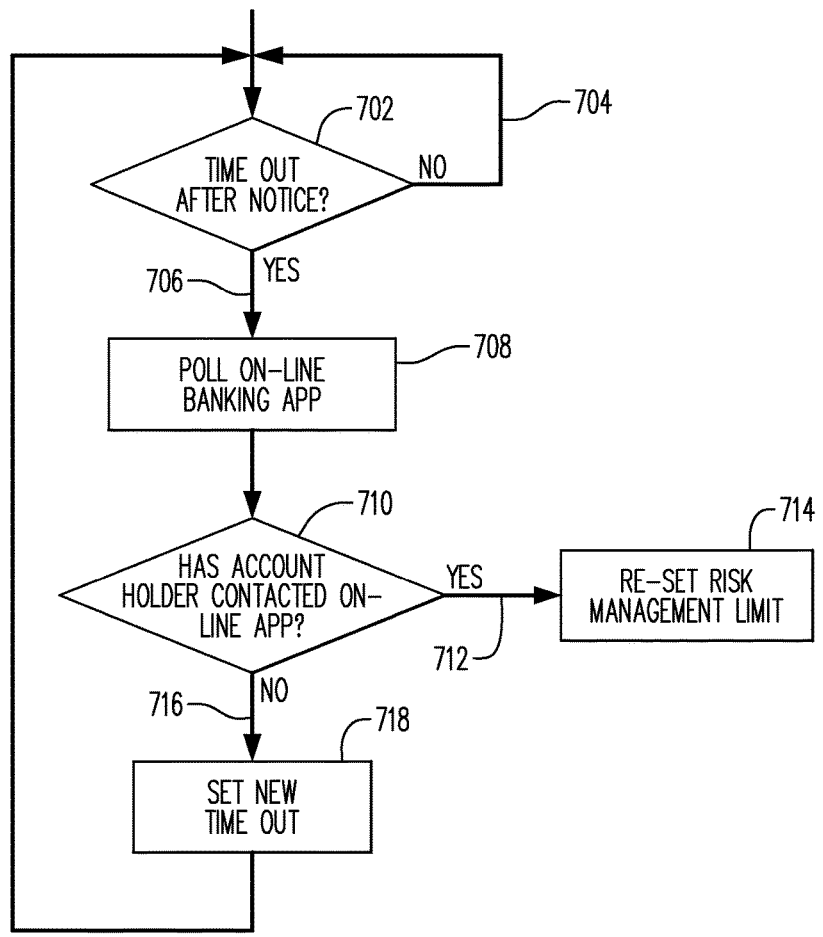
FIG. 7 is a flow chart that illustrates some details of the process that is illustrated in FIG. 4.

FIG. 7 is a flow chart that illustrates details about one or more ways in which the payment card issuer application program 212 of the payment card issuer server computer 102 may interact with the on-line banking application program 312 of the on-line banking host computer 118 so that the payment card issuer server computer 102 may be notified that the account holder has accessed his/her on-line banking website user account. That is, FIG. 7 illustrates an example embodiment of aspects of decision block 418 in FIG. 4. Thus, the process of FIG. 7 may follow execution by the payment card issuer server computer 102 of block 416 in FIG. 4, wherein the payment card issuer server computer 102 provides the warning notice to the account holder.

From block 416 in FIG. 4, the payment card issuer server computer 102 may advance to decision block 702 in FIG. 7. At decision block 702, the payment card issuer server computer 102 determines whether a predetermined amount of time has elapsed since the payment card issuer server computer 102 sent the warning notice to the account holder's mobile telephone. If that amount of time (the "time out period") has not elapsed, then the process of FIG. 7 idles, as indicated by branch 704 from decision block 702. However, once the time out period has elapsed, the process of FIG. 7 advances from decision block 702 via branch 706 to block 708. At block 708, the payment card issuer server computer 102 (and particularly the payment card issuer application program 212) sends a polling message to the on-line banking application program 312 of the on-line banking host computer 118 to inquire as to whether the account holder in question had accessed his/her on-line banking website user account in the time since the payment card issuer server computer 102 sent the warning message.

Based on a response from the on-line banking application program 312 to the polling message, the payment card issuer server computer 102 makes a determination as indicated at decision block 710. If the response from the on-line banking application program 312 indicates that the account holder has accessed his/her on-line banking website user account during the time period in question, then the process of FIG. 7 advances from decision block 710 via branch 712 to block 714, which is the same as block 420 in FIG. 4 (i.e., the payment card issuer server computer 102 re-sets the risk management limit). However, if the response from the on-line banking application program 312 indicates that the account holder has not accessed his/her on-line banking website user account during the time period in question, then the process of FIG. 7 advances from decision block 710 via branch 716 to block 718. At block 718, the payment card issuer server computer 102 (i.e., the payment card issuer application program 212) sets a new time out period, and the process of FIG. 7 then loops back to decision block 702.

In some embodiments, and in addition to or instead of the process shown in FIG. 7, the payment card issuer server computer 102 executes a similar process but with the same type of interaction with a mobile banking application program 314 (FIG. 3) of the on-line banking host computer 118 rather than with the on-line banking application program 312.

Figure 8:
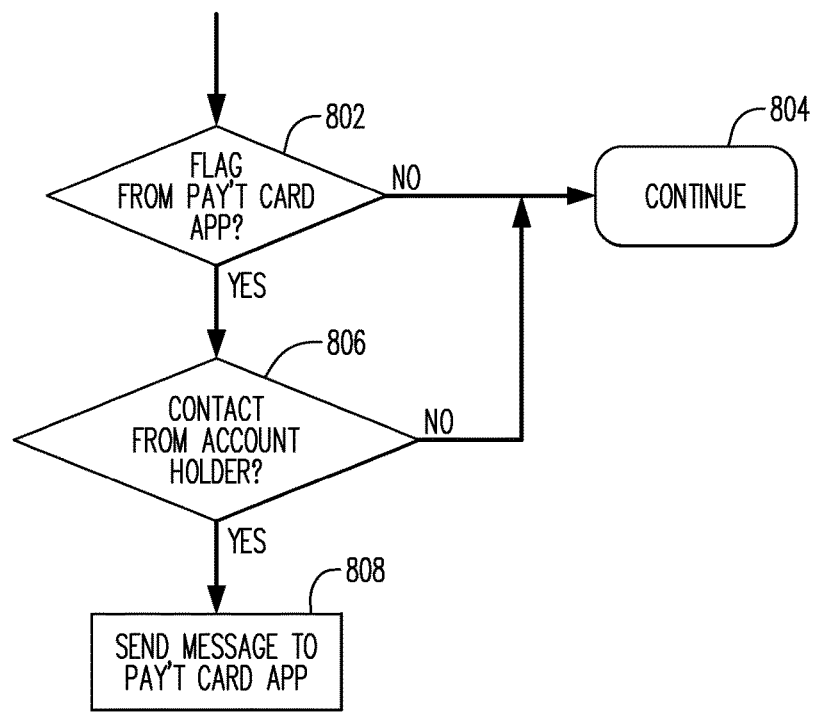
FIG. 8 is a flow chart that illustrates a process that may be performed by the server computer of FIG. 3 in accordance with aspects of the present invention.

Those who are skilled in the art will recognize that the interaction between the payment card issuer server computer 102 and the on-line banking host computer 118 may take other forms besides the polling message from the payment card issuer server computer 102 and the response from the on-line banking host computer 118, as indicated in FIG. 7. FIG. 8 is a flow chart that indicates—from the point of view of the on-line banking host computer 118—one example of an alternative type of interaction between the payment card issuer server computer 102 and the on-line banking host computer 118.

The process of FIG. 8 begins with a decision block 802. At decision block 802, the on-line banking application program 312 of the on-line banking host computer 118 determines whether it has flagged a particular on-line banking website user account in response to a request from the payment card issuer application program 212 of the payment card issuer server computer 102. If such is not the case, then other processing by the on-line banking application program 312 continues, as indicated at block 804. However, if the on-line banking application program 312 has flagged a particular on-line banking website user account at the request of the payment card issuer application program 212, then the on-line banking application program 312 of the on-line banking host computer 118 determines (as indicated at decision block 806) whether the user of the flagged account accesses the flagged account. If so, then the on-line banking application program 312 of the on-line banking host computer 118 reports (block 808) that fact to the payment card issuer application program 212 of the payment card issuer server computer 102 via a message from the on-line banking application program 312 to the payment card issuer application program 212. Otherwise, the on-line banking application program 312 continues with other processing.

In the above-described example embodiments, the on-line banking application program 312 and the payment card issuer application program 212 run on different server computers. However, in other embodiments, the payment card issuer server computer 102 and the on-line banking host computer 118 may be at least partially integrated with each other such that, for example, the on-line banking application program 312 and the payment card issuer application program 212 may execute on the same server computer. Consequently, the above noted interactions between the two programs may occur via inter-application messaging within the same computer.

In some embodiments, at least some of the server computers described herein may be operated by a third-party transaction processor rather than directly by the issuing FI.

In example embodiments described above, actions taken by the account holder result in authorization for re-setting a risk management spending limit. In a similar vein, and in other embodiments, the account holder may also or alternatively be permitted to pre-authorize exceptions to the risk management limit for relatively large intended purchases. For example, if the account holder intends to buy a $700.00 television set at Best Buy, he/she may provide a pre-notification to this effect to the payment card issuer application program 212 (either directly or indirectly, such as via the on-line banking application program 312 or the mobile banking application program 314). Consequently, the payment card issuer application program 212 (i.e., the payment card issuer server computer 102), when the authorization request for the purchase transaction comes through, will provide a favorable authorization response, notwithstanding a risk management limit that would otherwise have been applied to decline the transaction in the absence of the pre-notification.

In other embodiments, the account holder may pro-actively re-set the risk management limit by directly or indirectly contacting the payment card issuer application program 212, even without having received a notification that the risk management limit was imminent.

In above examples, the account holder has authorized re-setting of, or exceptions to, the risk management limit as it applied to his/her own transactions. However, in other embodiments, a system user may manage the risk management limit, including re-sets or pre-notification of transactions, for other individuals, such as the user's child or a subordinate or fellow employee at an organization.

It is noted that the term "on-line" is used in two somewhat similar but nonetheless distinct senses in this document. According to one sense of the term, it refers to accessing a website via a computer or mobile device. According to the other sense of the term, it refers to authorization of a payment card transaction via interaction with a remote computer that is operated by or on behalf of an issuer (issuing FI) of a payment card account. It will be clear from the context which meaning is intended when the term is used herein.

In the system embodiment shown in FIG. 1, the payment card issuer server computer 102 is shown as connected directly to the payment card system 104. However, in some embodiments, it may be desirable for there to be an authorization server computer (not shown) positioned in a logical sense between the payment card issuer server computer 102 and the payment card system 104.

Although the payment card issuer server computer 102 is portrayed in the above description as a single computer, it may in practice be constituted by two or more computers.

As used herein and in the appended claims, the term "computer" should be understood to encompass a single computer or two or more computers in communication with each other.

As used herein and in the appended claims, the term "processor" should be understood to encompass a single processor or two or more processors in communication with each other.

As used herein and in the appended claims, the term "memory" should be understood to encompass a single memory or storage device or two or more memories or storage devices.

A used herein and in the appended claims, "to request a re-set" may include actions that have the effect of authorizing a re-set even if such actions do not include explicitly making a request.

The flow charts and descriptions thereof herein should not be understood to prescribe a fixed order of performing the method steps described therein. Rather the method steps may be performed in any order that is practicable.

The principles of this invention are particularly suitable for use in connection with contactless payment devices affixed to mobile telephones, but are also more broadly applicable with other types of payment devices, in other formats including mag stripe cards, contactless and/or contact IC payment cards, RF fob payment devices, etc.

In some embodiments, re-setting of the risk management limit may be implemented by reducing the cumulative transaction dollar total to a positive dollar amount (e.g., $1.00, $5.00, $10.00 or $50.00) rather than to zero.

In some embodiments, risk management limits only apply to certain transactions charged to the payment card account, such as only transactions initiated from a contactless payment device.

As used herein and in the appended claims, the term "payment card system account" includes a credit card account or a deposit account that the account holder may access using a debit card. The terms "payment card system account" and "payment card account" are used interchangeably herein. The term "payment card account number" includes a number that identifies a payment card system account or a number carried by a payment card, or a number that is used to route a transaction in a payment system that handles debit card and/or credit card transactions. The term "payment card" includes a credit card or a debit card.

As used herein and in the appended claims, the term "payment card system" refers to a system for handling purchase transactions and related transactions and operated under the name of MasterCard, Visa, American Express, Diners Club, Discover Card or a similar system. In some embodiments, the term "payment card system" may be limited to systems in which member financial institutions issue payment card accounts to individuals, businesses and/or other organizations.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A risk management method for a payment device system comprising:

setting, in a payment card issuer computer, a risk management limit to be applied to authorized purchase transactions for a payment card account;

detecting in the payment card issuer computer that purchase transactions for the payment card account have approached the risk management limit;

sending a warning message from the payment card issuer computer to a mobile telephone of a holder of the payment card account to notify the holder that the risk management limit is imminent;

detecting, by the payment card issuer computer, that the holder has requested re-setting of the risk management limit; and in response to detecting the holder requested re-setting of said risk management limit, re-setting said risk management limit in the payment card issuer computer.

2. The method of claim 1, wherein the holder requested re-setting of said risk management limit by accessing an on-line banking account that belongs to the holder.

3. The method of claim 2, wherein said holder accessing said on-line banking account does not include transferring funds to the payment card account.

4. The method of claim 2, wherein the on-line banking account is a mobile banking account.

5. The method of claim 2, wherein the on-line banking account is a website user account.

6. The method of claim 1, wherein the warning message is a text message.

7. The method of claim 1, wherein the risk management limit is expressed as a monetary amount.

8. The method of claim 1, wherein the risk management limit is expressed as a number of transactions.

9. The method of claim 1, wherein the holder requested re-setting of said risk management limit by sending a response to the warning message.

10. The method of claim 9, wherein the holder sent the response by actuating an option displayed on the mobile telephone.

11. A risk management method for a payment device system comprising:

a payment card issuer application program sending a warning message to a mobile telephone of a holder of a payment card account to notify the holder that a risk management limit is imminent, the payment card issuer application program running on a server computer;

at a predetermined time after sending the warning message, the issuer payment card application program polling an on-line banking application program to determine whether the on-line banking application program has been contacted by the holder of the payment card account after the sending of the warning message;

the payment card issuer application program receiving a response from the on-line banking application program, said response indicating that the holder of the payment account has contacted the on-line banking application program; and after the payment card issuer application program receives said response from the on-line banking application program, the payment card issuer application program re-setting the risk management limit.

12. The method of claim 11, wherein the on-line banking application program also runs on the server computer.

13. The method of claim 11, wherein:
the server computer is a first server computer; and
the on-line banking application program runs on a second server computer that is different from the first server computer.

14. A payment device system comprising:
a user mobile telephone;
a mobile network;
a data network;
a payment card issuer computer operably connected to the data network and to the mobile network, the payment card issuer computer comprising a payment card issuer processor operably connected to a storage device, and wherein the storage device comprises instructions configured to cause the payment card issuer processor to:
set a risk management limit to be applied to authorized purchase transactions for a payment card account;
detect that purchase transactions for the payment card account have approached the risk management limit;
send a warning message to a mobile telephone of a holder of the payment card account via the mobile network that notifies the holder that the risk management limit is imminent;
detect that the holder requested re-setting of the risk management limit; and
re-set the risk management limit.

15. The system of claim 14, further comprising an on-line banking host computer operably connected to the data network and hosting an on-line bank account of the holder, wherein the holder requested re-setting of the risk management limit by accessing the on-line banking account of the holder without transferring funds to the payment card account.

16. A payment device system comprising:
a user mobile telephone;
a mobile network;
a data network;
a payment card issuer computer operably connected to the data network and to the mobile network, the payment card issuer computer comprising a payment card issuer processor operably connected to a storage device, and wherein the storage device comprises a payment card issuer application program including instructions configured to cause the payment card issuer processor to:
transmit a warning message via the mobile network to the user mobile telephone of a holder of a payment card account to notify the holder that a risk management limit is imminent;
polling, at a predetermined time after transmitting the warning message, an on-line banking application program to determine whether the on-line banking application program has been contacted by the holder;
receiving a response from the on-line banking application program indicating that the holder of the payment account has contacted the on-line banking application program; and
re-setting the risk management limit.

17. The system of claim 16, further comprising an on-line banking host computer operably connected to the data network and running the on-line banking application, wherein the on-line banking host computer hosts an on-line bank account of the holder, and wherein the on-line banking host computer receives a request from the holder to reset the risk management limit without transferring funds to the payment card account.

* * * * *